US008260882B2

(12) United States Patent
Kim et al.

(10) Patent No.: US 8,260,882 B2
(45) Date of Patent: Sep. 4, 2012

(54) SHARING OF MULTIMEDIA AND RELEVANCE MEASURE BASED ON HOP DISTANCE IN A SOCIAL NETWORK

(75) Inventors: Eun-Gyu Kim, Mountain View, CA (US); Chris Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 748 days.

(21) Appl. No.: 11/957,069

(22) Filed: Dec. 14, 2007

(65) Prior Publication Data

US 2009/0157845 A1 Jun. 18, 2009

(51) Int. Cl.
G06F 15/16 (2006.01)
G06F 15/173 (2006.01)
G06F 15/177 (2006.01)

(52) U.S. Cl. ........ 709/218; 709/217; 709/223; 709/227; 709/244

(58) Field of Classification Search .................. 709/217, 709/218

See application file for complete search history.

(56) References Cited

U.S. PATENT DOCUMENTS

| 5,974,442 | A | 10/1999 | Adams |
|---|---|---|---|
| 7,024,404 | B1 | 4/2006 | Gerasoulis et al. |
| 7,069,303 | B2 | 6/2006 | Sikora et al. |
| 7,174,382 | B2 * | 2/2007 | Ramanathan et al. ........ 709/227 |
| 7,366,759 | B2 | 4/2008 | Trevithick et al. |
| 7,376,715 | B2 | 5/2008 | Cunningham et al. |
| 7,587,461 | B2 | 9/2009 | Baluja et al. |
| 7,765,265 | B1 | 7/2010 | Granito et al. |
| 2002/0138581 | A1 | 9/2002 | MacIntosh et al. |
| 2004/0054733 | A1 | 3/2004 | Weeks |
| 2004/0162071 | A1 | 8/2004 | Grilli et al. |
| 2005/0171954 | A1 | 8/2005 | Hull et al. |
| 2005/0174975 | A1 | 8/2005 | Mgrdechian et al. |
| 2005/0198160 | A1 | 9/2005 | Shannon et al. |
| 2005/0203800 | A1 | 9/2005 | Sweeney et al. |
| 2005/0203801 | A1 | 9/2005 | Morgenstern et al. |
| 2005/0278438 | A1 | 12/2005 | Sandaire |
| 2006/0042483 | A1 | 3/2006 | Work et al. |
| 2006/0136560 | A1 | 6/2006 | Jiang |
| 2006/0143236 | A1 * | 6/2006 | Wu ............................ 707/104.1 |
| 2006/0173824 | A1 | 8/2006 | Bensky et al. |

(Continued)

FOREIGN PATENT DOCUMENTS

EP 1591939 A2 11/2005

OTHER PUBLICATIONS

Official Communication for U.S. Appl. No. 11/947,647 mailed Aug. 19, 2010.

(Continued)

*Primary Examiner* — Wing Chan
*Assistant Examiner* — David X Yi
(74) *Attorney, Agent, or Firm* — Frommer Lawrence & Haug LLP; John W. Branch (57) ABSTRACT

A method, system, and apparatus are directed to sharing information over a network. A request to share a multimedia object may be received. A relevance measure may be retrieved based on an identity of the multimedia object. Sharing the network of the multimedia object between an originating sharing member and a plurality of members of a social network may be enabled. A combination of the relevance measure and a hop distance for the shared multimedia object may be provided.

19 Claims, 6 Drawing Sheets

U.S. PATENT DOCUMENTS

| | | | |
|---|---|---|---|
| 2006/0235873 A1* | 10/2006 | Thomas | 707/102 |
| 2006/0235933 A1 | 10/2006 | Baluja et al. | |
| 2006/0271564 A1 | 11/2006 | Meng Muntz et al. | |
| 2007/0088711 A1 | 4/2007 | Craggs | |
| 2007/0088785 A1 | 4/2007 | Cama | |
| 2007/0112761 A1 | 5/2007 | Xu et al. | |
| 2007/0169165 A1 | 7/2007 | Crull et al. | |
| 2007/0179945 A1 | 8/2007 | Marston et al. | |
| 2007/0180043 A1 | 8/2007 | Vernal et al. | |
| 2007/0252004 A1* | 11/2007 | Shiraki et al. | 235/383 |
| 2007/0255807 A1 | 11/2007 | Hayashi et al. | |
| 2007/0271336 A1 | 11/2007 | Ramaswamy | |
| 2008/0004944 A1 | 1/2008 | Calabria | |
| 2008/0005108 A1 | 1/2008 | Ozzie et al. | |
| 2008/0028294 A1* | 1/2008 | Sell et al. | 715/234 |
| 2008/0052369 A1 | 2/2008 | Weber et al. | |
| 2008/0052371 A1* | 2/2008 | Partovi et al. | 709/217 |
| 2008/0301237 A1* | 12/2008 | Parsons et al. | 709/206 |
| 2009/0143051 A1 | 6/2009 | Kim et al. | |
| 2009/0144377 A1 | 6/2009 | Kim et al. | |
| 2009/0157845 A1 | 6/2009 | Kim et al. | |
| 2009/0158176 A1 | 6/2009 | Kalaboukis et al. | |
| 2009/0319628 A1 | 12/2009 | Kumpula et al. | |
| 2010/0042944 A1 | 2/2010 | Robinson et al. | |
| 2010/0169492 A1 | 7/2010 | Lee | |
| 2011/0066725 A1 | 3/2011 | Kim | |
| 2011/0087734 A1 | 4/2011 | Parsons et al. | |

OTHER PUBLICATIONS

Official Communication for U.S. Appl. No. 11/947,647 mailed Nov. 29, 2010.
Official Communication for U.S. Appl. No. 12/947,782 mailed Apr. 4, 2011.
Official Communication for U.S. Appl. No. 12/947,782 mailed Jul. 22, 2011.
Official Communication for U.S. Appl. No. 11/948,887 mailed Sep. 9, 2009.
Official Communication for U.S. Appl. No. 11/948,887 mailed Nov. 16, 2009.
Official Communication for U.S. Appl. No. 11/948,887 mailed May 17, 2010.
Official Communication for U.S. Appl. No. 11/948,887 mailed Oct. 13, 2010.
Official Communication for U.S. Appl. No. 11/948,887 mailed Jan. 6, 2011.
Pownce, Wikipedia, pp. 1-2 http://en.wikipedia.org/w/index.php?title-Pwonce&Printable=yes, Nov. 27, 2007.
Pownce, Sent stuff to your friends, pp. 1-3 http://pownce.com, Nov. 27, 2007.
Office Communication for U.S. Appl. No. 11/947,647 mailed Apr. 15, 2010.

* cited by examiner

SHARING OF MULTIMEDIA AND RELEVANCE MEASURE BASED ON HOP DISTANCE IN A SOCIAL NETWORK

FIELD OF THE INVENTION

The present invention relates generally to communication on mobile devices, and more specifically, but not exclusively, to sharing content over a social network.

BACKGROUND

Tremendous changes have been occurring on the Internet that influence our everyday lives. For example, online social networks have become the new meeting grounds. The development of such online social networks touches countless aspects of our everyday lives, providing instant access to people of similar mindsets, and enabling us to form partnerships with more people in more ways than ever before.

One aspect of our everyday lives that may be affected by online social networking technology is the ease with which information may be shared over the Internet. However, all too often while some shared information may be interesting to some people, it may not be interesting to others.

Current music sharing tools enable sending music or posting of music. However, such tools are difficult to use, and the popularity of the shared music may be difficult to determine. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, the terms "device input" or "user input" refer to a user input command at a device.

As used herein, the terms "social network" and "social community" refer to a concept of an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

As used herein, the term "web content" refers to any data displayable within a markup language document, employing for example, Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like. As used herein, the term "hyperlink" refers to an addressing component that enables retrieving data over a network, including a Uniform Resource Identifier (URI), Uniform Resource Locator (URL), or the like.

As used herein, the terms "multimedia" or "multimedia object" refer to any audio/visual data that is playable over a period of time. Such data includes tracks, songs, voice files, animation files, presentations, video, or the like. Such data may also include annotations, such as titles, lyrics, time points, or the like associated with at least a portion of the data.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly, the present invention is directed to sharing information over a network. A request to share a multimedia object may be received. A relevance measure may be retrieved based on an identity of the multimedia object. Sharing the network of the multimedia object between an originating sharing member and a plurality of members of a social network may be enabled. A combination of the relevance measure and a hop distance for the shared multimedia object may be provided.

Illustrative Operating Environment

Figure 1:
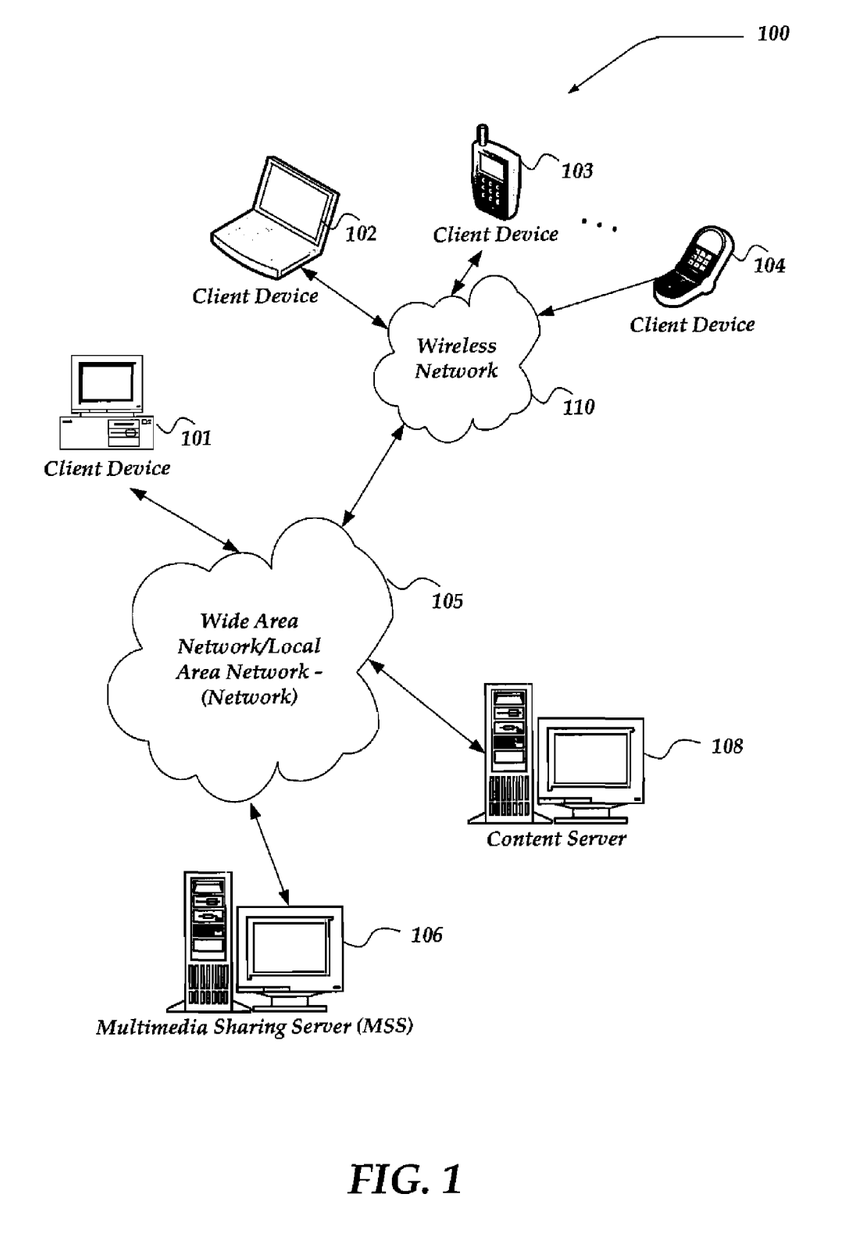
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, multimedia sharing server (MSS) 106, and content server 108.

Generally, client devices 102-104 may include virtually any mobile computing device capable of receiving and sending a message over a network, such as wireless network 110, or the like. Such devices include portable devices such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device useable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a Wireless Application Protocol (WAP) message, or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), Internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, MSS 106, or the like. Such user account, for example, may be configured to enable the user to receive emails, send/receive IM messages, SMS messages, access selected web pages, participate in a social networking activity, provide messages that may include hyperlinks or attachments, or the like. However, managing of messages may also be performed without logging into the user account.

Thus, a user of client devices 101-104 may employ any of a variety of client applications to access content, read articles, read messages, compose messages, send messages, or the like. In one embodiment, a user of client devices 101-104 may access a news article, or other item of interest from, for example, content server 108. The user may then select to forward a message to another user of one of client devices 101-104 about the accessed content, article, or the like.

In one embodiment, client devices 101-104 may enable a sharing area for sharing content with members of a social network and for playing the content. Client devices 101-104 may enable playing a multimedia object. The multimedia object may be selected for sharing by the user. The selection may be received using an application programming interface (API) of an operating system, an event trigger, or the like. The selection may be received in the client application (e.g., web browser), in a plug-in to the client application, or the like. The multimedia object may then be sent to MSS 106 over networks 105 and/or 110 in preparation for sharing with members of a social network. MSS 106 may provide a hyperlink to at least some types of the multimedia object on MSS 106. In one embodiment, MSS 106 may provide a hyperlink to a copy of the multimedia object on MSS 106. In any case, a hyperlink, or the actual multimedia object itself may be forwarded to at least one of client devices 101-104.

The message may be forwarded using any of a variety of message protocols, including but not limited to SMS, IM, MMS, email, or the like. Moreover, in one embodiment, the forwarded message may include a reference to the content, article, or message using, for example, an attachment, a hyperlink, a copy of the content, article, or message within the forwarded message, or virtually any other mechanism. The user may select to forward the message as a form of gossip (or any other form of communication) to members of a social network. It should be noted that the term gossip as used herein refers to a classification of content. However, the invention is not limited to merely managing gossip messages, and any content may be managed using the invention.

In one embodiment, the message may be forwarded anonymously such that the recipients may not readily determine from whom the message is actually forwarded. This may be performed in a variety of ways. For example, in one embodiment, a header of the forwarded message indicating a source of the message may be blank, may include an alias, a fake identifier, or the like.

When another user receives the forwarded message, that recipient user may select to ignore the message, read the message, delete the message, or forward the message to at least one other user of one of client devices 101-104. In one embodiment, as the message is forwarded to other members in the social network, a hop distance may be determined in real-time. In one embodiment, the hop distance may be determined by MSS 106 and provided to each client device receiving and/or forwarding the message. However, the invention is not so limited, and the hop distance may be determined using any of a variety of other mechanisms. For example, in one embodiment, one or more client devices receiving and/or forwarding the message may determine the hop distance. This may be performed using a variety of ways, including, for example, including with the message information about a number of hops the message traversed to reach a recipient; sending an acknowledgement back through a chain of forwarding client devices where the acknowledgments may be used to determine the hop distance; or any of a variety of other ways. Thus, in one embodiment, the hop distance may be determined using any of a variety of peer-to-peer approaches, a server based approach, or even a combination of peer-to-peer and server based approach.

In any event, the hop distance may then be displayed at a client device, in one embodiment, along with the message, to indicate a level of interest by the members of the social network. That is, the more times the message is forwarded by different users in a sequence of users (e.g., client devices) the greater the determined hop distance. Thus, a user may view the hop distance as an indicator of how interesting or newsworthy the message may be.

In one embodiment, to whom the message is to be forwarded may be determined automatically based on an address book, buddy list, or any other form of contact list associated with the user requesting the message to be forwarded. For example, a user may employ a client application to indicate that a message is to be forwarded. When the indication is received by the client device, or other network device, the user's contact list may be examined to determine to whom to forward the message. Embodiments of an interface useable to display and otherwise manage messages using a sharing area and/or player are described in more detail below in conjunction with FIGS. 5-6.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple MSS 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of cluster server 106 is described in more detail below in conjunction with FIG. 3. Briefly, however, MSS 106 may include any computing device capable of connecting to network 105 to enable managing of messages within a social network. In one embodiment, MSS 106 may provide an interface to a user of client devices 101-104 that may be used to post, spread, delete, or otherwise manage distribution of messages, including gossip messages.

MSS 106 may further dynamically determine hop distances for respective messages, enable rank ordering of messages for a client device, and enable automatic deletion of a message based, in part, on hop distance. In one embodiment, if a message is ignored by a message recipient for a defined time period, the message may also be automatically deleted from a display of messages to the recipient.

MSS 106 may, in one embodiment, provide to a client device, a determined hop distance for display with a respective message. In one embodiment, the hop distance may be configured to be dynamically updated in real-time for the client device as the message is forwarded through a social network of users, such as might be represented by client devices 101-104, or the like. In one embodiment, MSS 106 might be configured to determine hop distance based on how a user of a client device responds to a received message. For example, in one embodiment, where a user receives a message and selects to forward the message to another client device, the hop distance might be determined based on a longest sequence of client devices for which the message is forwarded. In one embodiment, the hop distance displayed at a client device might be independent of whether the user forwarded the message or did not forward the message. That is, in one embodiment, the user might always see the hop distance to reflect the longest sequence, even if that user is not within the longest sequence of users. In another embodiment, if the user is not within the longest sequence, the hop distance displayed for that user might reflect the length of the sequence of users for which that user is a member. However, the displayed hop distance for a given user is not limited to these embodiments, and any of a variety of other hop distances may be determined for display at a client device, without limiting the scope of the invention.

As noted, MSS 106 may receive a selected multimedia object that was indicated for sharing. MSS 106 may pre-process the multimedia object for sharing. In one embodiment, MSS 106 may receive the multimedia object, copy the multimedia object in a database, create a hyperlink to the multimedia object, or the like. MSS 106 may send the multimedia object to at least one of client devices 101-104 associated with members of a social network. In another embodiment, MSS 106 may send a hyperlink to the multimedia object back to the originating client device requesting MSS 106 to pre-process the multimedia object for sharing. In one embodiment, the originating client device may share the hyperlink and/or multimedia object using a variety of techniques described above, including a peer-to-peer sharing. MSS 106 may employ a process substantially similar to the process described below in conjunction with FIGS. 4-5 to perform at least some of its actions.

It should be noted that while FIG. 1 illustrates a use of MSS 106 to manage messages based on hop distances and/or shared multimedia objects of content, the invention is not so limited. For example, as noted above, client devices 101-104 may also be configured with a client application, script, plug-in, applet, or the like, that is configured and arranged to enable the client device to manage messages using hop distances.

Moreover, in another embodiment, various functions performed by MSS 106 may be distributed across a plurality of network devices.

Devices that may operate as MSS 106 include personal computers, desktop computers, multiprocessor systems, microprocessor-based or programmable consumer electronics, network PCs, servers, or the like.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user. Moreover, content server 108 may also be configured to manage information for a user, such as an address book, buddy list, or other type of contact list. Such contact lists may be made available to MSS 106, in one embodiment.

Devices that may operate as content server 108 include, but are not limited to personal computers, desktop computers, multiprocessor systems, microprocessor-based or programmable consumer electronics, network PCs, servers, network appliances, and the like.

Illustrative Client Environment

Figure 2:
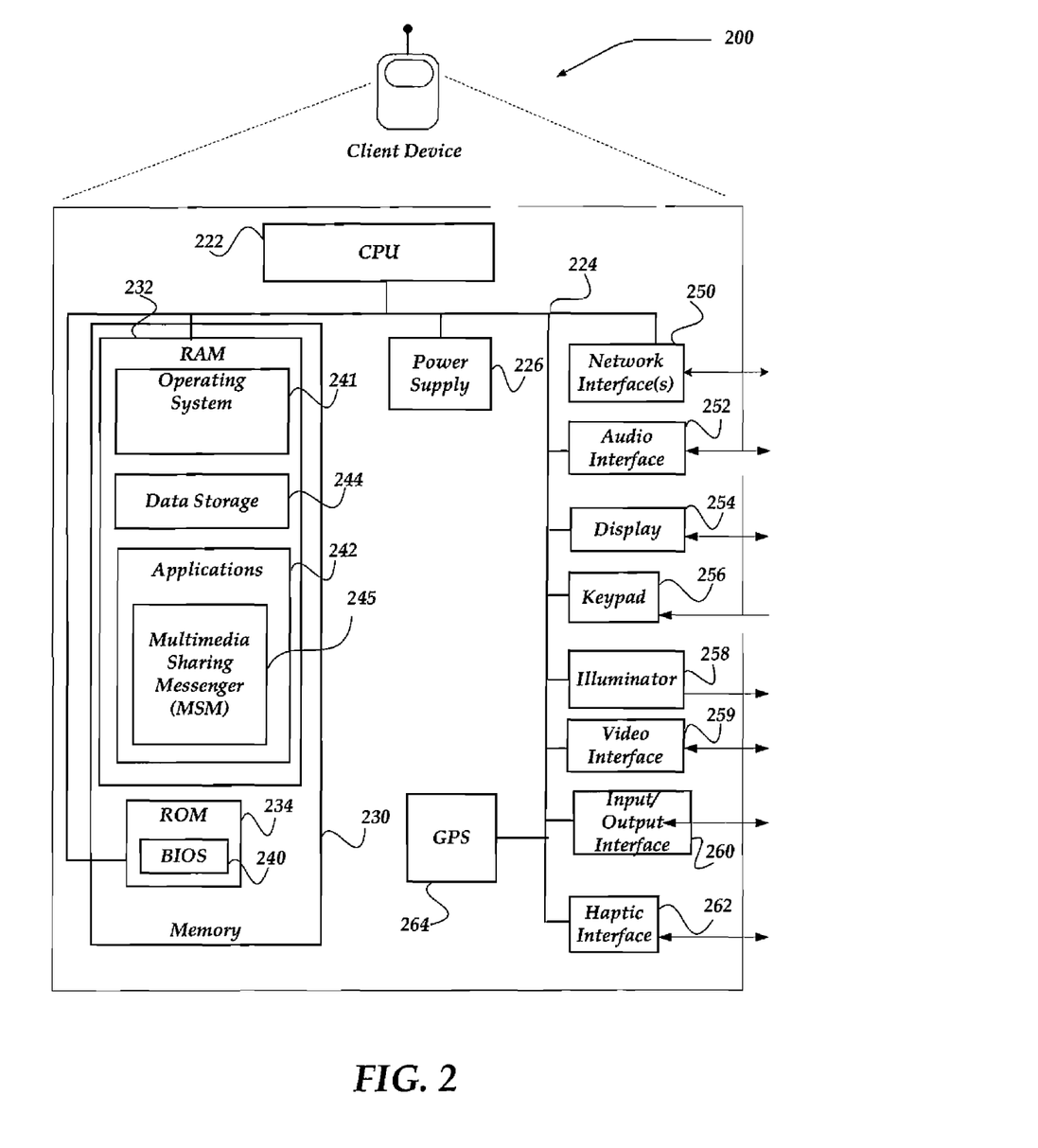
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include multimedia sharing messenger (MSM) 245. In one embodiment, MSM 245 may be an application configured to share content of a plurality of types. MSM 245 may provide at least one window/sharing area. In one embodiment, MSM 245 may enable the sharing area(s) as a stand alone window(s), as part of a browser application, a messenger application, a multimedia player, or any other application.

Figure 5:
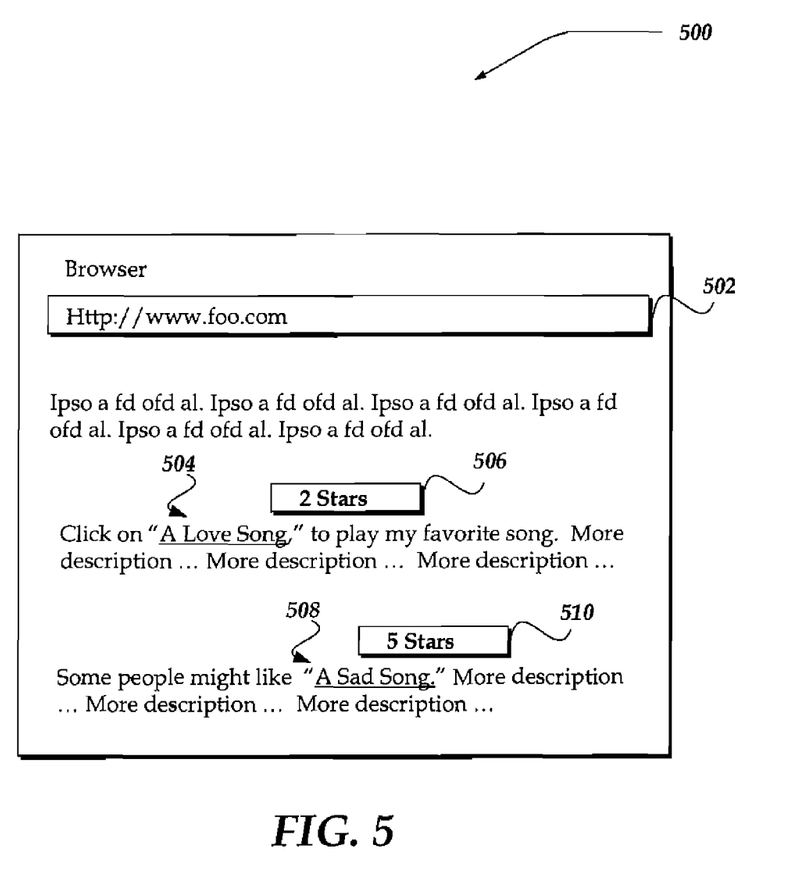
FIG. 5 illustrates an example interface useable for showing relevance measures for multimedia within a browser.
Figure 6:
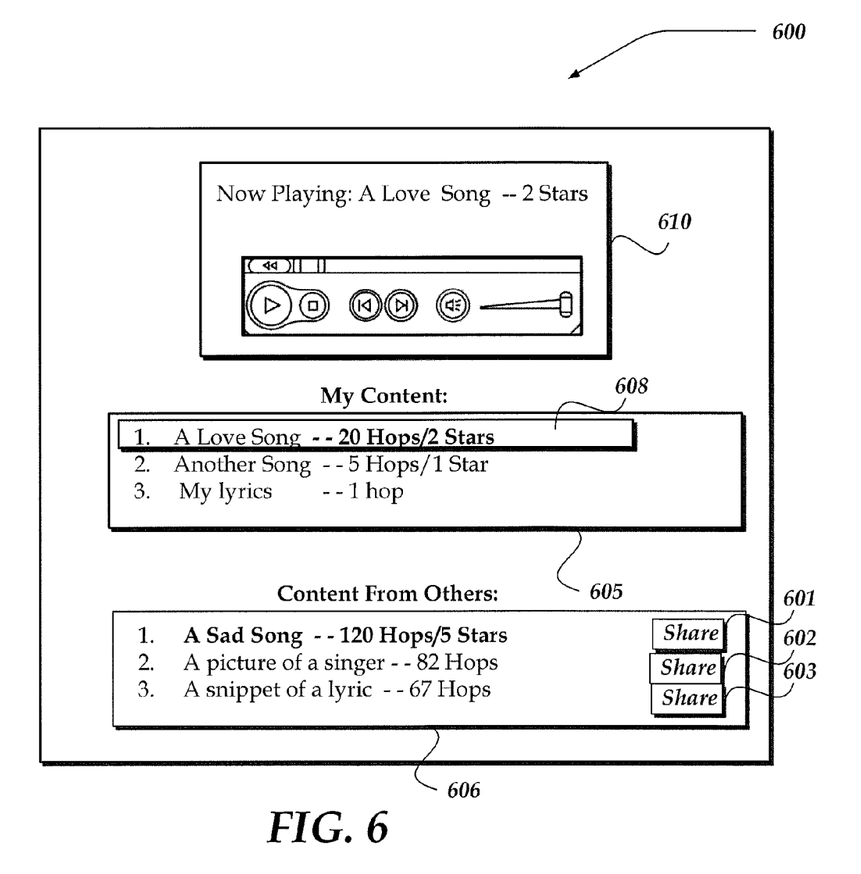
FIG. 6 illustrates an example interface useable for sharing multimedia and associated relevance measures.

Embodiments of interfaces useable on mobile device 200 for managing messages are described in more detail below in conjunction with FIGS. 5-6. Briefly, as shown in FIG. 6, MSM 245 may include a sharing area, player, and/or a display list component for displaying a plurality of items, wherein at least one of the items is a shared multimedia object and a co-located hop distance and/or combination relevance measure that is updated in real-time for each sharing of the portion between at least two members of a social network. MSM 245 may also include a message display component for displaying the shared multimedia object and/or a project component configured to organize the shared multimedia object into at least one project, and transmit/receive over the network interface(s) 250 the shared multimedia object with another device enabling another sharing area, wherein the other sharing area is associated with or otherwise has subscribed to at least one of the projects.

In one embodiment, MSM 245 may include a browser application with a downloadable plug-in, script, applet, or the like, that is configured and arranged to manage messages using hop distances. MSM 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed. As shown in FIG. 5 relevance measures may be overlaid (hovering) in close proximity with associated hyperlinks for a multimedia object within a web page. In one embodiment, the relevance measures may be enabled by the browser, by JavaScript, a browser plug-in, using for example, XML User Interface Language (XUL), or the like.

MSM 245 may further be configured as a messenger application that is configured to send, to receive, and/or to otherwise process messages using SMS, MMS, IM, email, VOIP, and/or any of a variety of other messaging communication protocols. Although a single MSM 245 is illustrated it should be clear that multiple applications may be employed. For example, one MSM 245 may be configured to manage SMS messages, where another application may manage IM messages, and yet another messaging client is configured to manage emails, or the like, with one or more of such applications being able to manage messages using hop distances.

In one embodiment, MSM 245 may be configured and arranged to manage forwarding of a sharing message. In one embodiment, MSM 245 may be configured to receive a selection of a multimedia object for sharing. MSM 245 may pre-process the selection of the multimedia object for sharing. In one embodiment, MSM 245 may send the multimedia object over network interface(s) 250 to a server for further preparation. In one embodiment, based on the type of the multimedia object, MSM 245 may receive a hyperlink to a copy of the multimedia object. In another embodiment, MSM 245 may pre-process the selected content locally, for example, by copying the multimedia object into memory 230, or the like. MSM 245 may host (e.g., through a web server) a copy of the multimedia object and may send a hyperlink to the multimedia object with a sharing message.

In any case, MSM 245 might automatically determine a list of recipients to whom the sharing message is to be forwarded. In one embodiment, MSM 245 might employ a contact list, or the like, to make such a determination. MSM 245 may send the sharing message to at least another client device. In one embodiment, MSM 245 may send the sharing message to a server over network interface(s) 250 for further sharing, may send the sharing message directly to other client devices over network interface(s) 250, or the like.

Illustrative Network Device Environment

Figure 3:
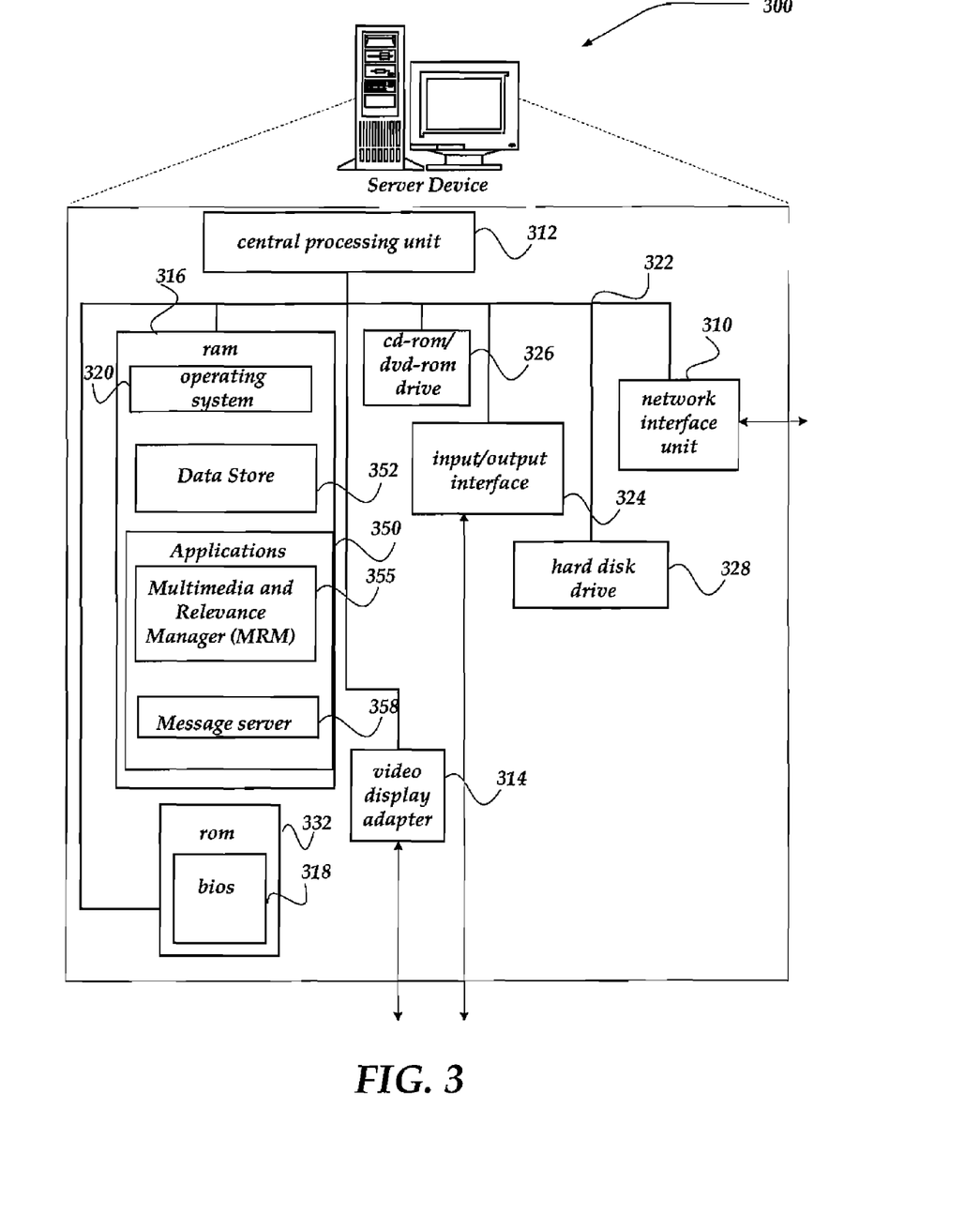
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Multimedia and Relevance Manager (MRM) 355 and message server 358.

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages.

In one embodiment, message server 358 may receive a selected multimedia object (e.g., web content) over network interface unit 310 to be pre-processed for sharing. The multimedia object may be indicated to be shared with at least one member of a social network (e.g., from a content list of a user, or the like). In one embodiment, message server 358 may determine to send the multimedia object or a link to the multimedia object within a sharing message. The determination may be made based on an ownership of the multimedia object, a preference of a user forwarding the multimedia object, a type of the multimedia object, or the like. Based on the determination of the multimedia object, a copy of the multimedia object may be stored on, for example, data store 352 (e.g., in a sharing database). Message server 358 may provide a hyperlink, such as a URL, or the like, to the stored multimedia object. In one embodiment, the hyperlink and/or the multimedia object itself may be shared with client devices associated with members of the social network over network interface unit 310.

In one embodiment, message server 358 may communicate with MRM 355 to enable a user to manage messages using hop distances. In one embodiment, MRM 355 may provide a script, applet, application, or other downloadable component, to a client device for use in managing messages using hop distances. In another embodiment, MRM 355 may provide information to message server 358, including an interface, or the like, for use in displaying, and/or otherwise managing messages. Although not illustrated, in one embodiment, MRM 355 may be configured as a plug-in, or the like, to message server 358. In another embodiment, the hop distance information may be sent to client devices based on a pull of information. For example, client devices may request the multimedia object and/or associated hop distance over network interface unit 310. MRM 355 may provide the interface based on the request. In another embodiment, each client device indicated as actively receiving the multimedia object and/or the hop distance may be sent an update of the hop distance (e.g., in real-time).

In one embodiment, message server 358 may be configured and arranged to receive a message. In one embodiment, the message may be associated with hop distance information. MRM 355 may receive the hop distance information, and/or otherwise determine in real-time a hop distance for the message based on the received information. The determined hop distance may then be provided to message server 358 for providing with the message. In one embodiment, the hop distance might not be provided until, for example, the user performs some defined action, such as reading the message, forwarding the message, or the like. In one embodiment, the hop distance determined based on a number of hops the message traversed to the given user might be provided with the message; but, the hop distance might not be updated if other recipients select to forward the message—until, for example, the given user selects to also forward the message. In one embodiment, the message may be displayed to the user in a rank ordering of messages based on message hop distances.

Generalized Operation

Figure 4:
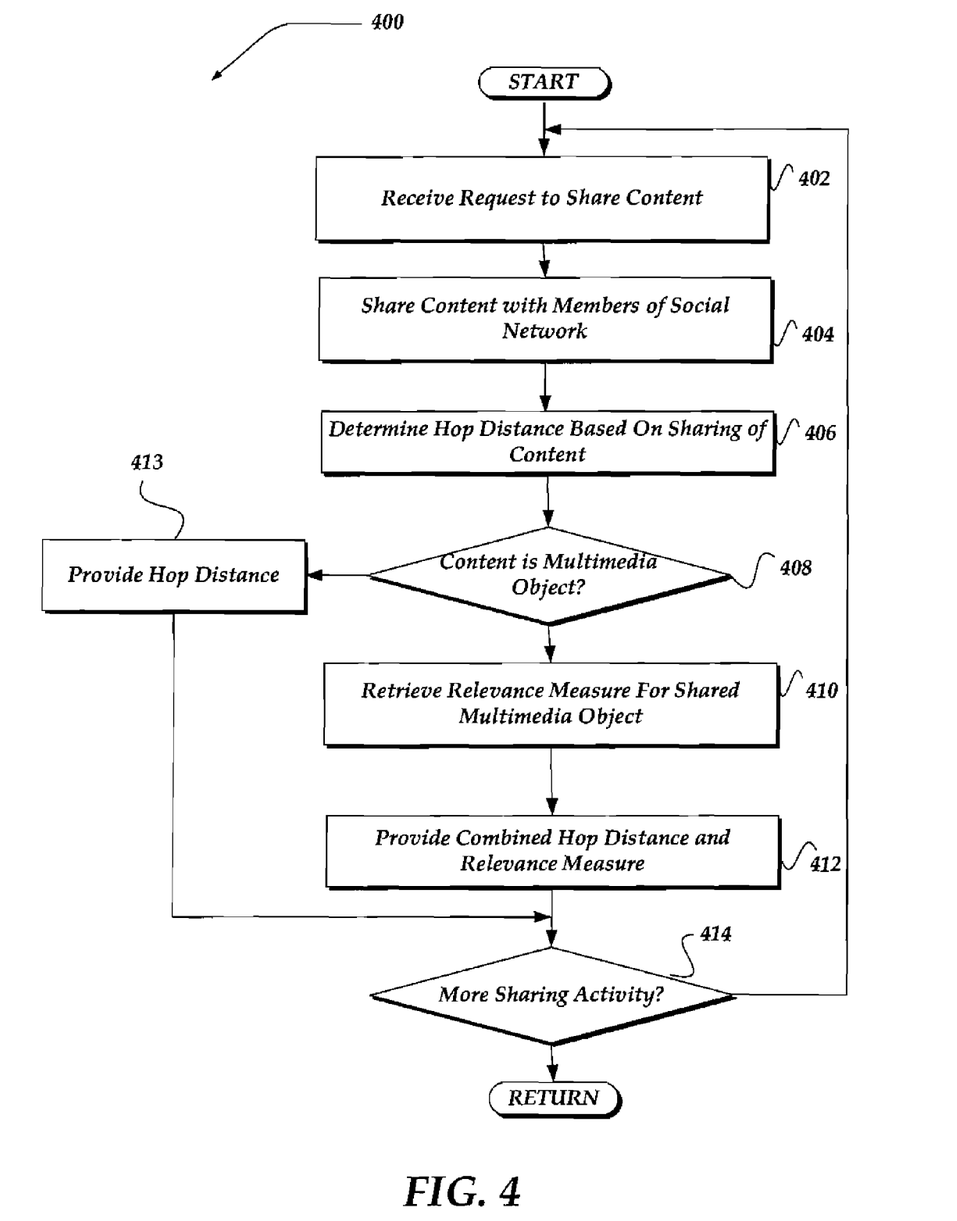
FIG. 4 illustrates a logical flow diagram generally showing one embodiment of a process for sharing multimedia and relevance measures based on hop distances in a social network.

The operation of certain aspects of the invention will now be described with respect to FIG. 4. FIG. 4 provides a logical flow diagram of certain aspects of the present invention. The process of FIG. 4 may be implemented, for example, within client devices 101-104 and/or MSS 106 of FIG. 1.

FIG. 4 illustrates a logical flow diagram generally showing one embodiment of processes for sharing at least one multimedia object by at least one member of a social network. Process 400 begins at block 402, a request to share a content is received. In one embodiment, based on the request, a sharing message may be generated or otherwise retrieved. The sharing message may comprise at least a link to the content or the content itself. In one embodiment, the content may comprise a multimedia object. In another embodiment, the other content may include a text object, a hyperlink object, a portion of content (web), a fragment of a web page, or the like.

In one embodiment, a user may select to have a sharing message sent to others. In one embodiment, an interface may be provided to a user to enable the user to post or otherwise send the sharing message. One embodiment of such an interface is illustrated in FIG. 6. However, other interfaces may also be used. The message may be one that the user received from another user, or one that the user has composed. For example, the user might have viewed something, heard something, or the like, of interest, and wants to share the information (e.g., multimedia object).

In one embodiment, the message may comprise several fields, meta-data, or the like. The message may include a message body (e.g., multimedia object), a subject line, lyrics, genre, artist, or the like. The user might insert content into a message body, including a link to an article, other content, modify the fields, meta-data, or the like. The user may then select an icon, or the like, to request that the message be sent. In another embodiment, the user might read a received message and select to have that received message forwarded. In one embodiment, the user might modify the message by including additional information in an associated message body, subject line, or the like.

At block 404, sharing over the network, of the content between an originating sharing member and a plurality of members of a social network is enabled. In one embodiment, the social network may include some or even all contacts in a contact list for a user originating the shared content—i.e., an originating sharing member. In one embodiment, the contact list may be the list of Instant Messaging (IM) users to which the originating sharing member has access. In one embodiment, meta-data associated with the shared content may also be sent. For example, the author, date, time to live, or the like, may be sent with the shared content. In one embodiment, the content may be stored on a server and/or client device before being sent. In one embodiment, a hyperlink to the stored content may be sent in the sharing message. In another embodiment, the content may be sent within the sharing message.

A determination may be made to send either the hyperlink or the actual content (e.g., multimedia object) based on an ownership of the multimedia object, a preference of a user forwarding the multimedia object, a type of the multimedia object, or the like. In one embodiment, a user sending a multimedia object may not have permission to share the actual multimedia object, based on, for example, digital rights management (DRM) rights. The user may send a hyperlink to the multimedia object. The receiver may play the multimedia object from the hyperlink if the receiver has permission.

In one embodiment, the content may be shared a plurality of times, beginning with the originating sharing member, and/or between a plurality of members of the social network. In an alternate embodiment, at block 408 instead of sharing a plurality of contents one at a time, a plurality of contents may be shared collectively with each other (e.g., within the same communication) by the originating sharing member.

At block 406, a hop distance for the shared content is determined. In one embodiment, the hop distance may be determined in real-time for the message. In one embodiment, the hop distance may be determined based on a count of each request received to forward the message. Thus, if the message was requested to be forwarded to the user by a previous user, the hop distance might be initially at least one. When the present user requests that the message be forwarded, independent of the number of potential recipients the message is to be forwarded to, the (updated) hop distance would increase by one, and so forth. In another embodiment, the hop distance may be updated as the message is received by a recipient, as the message is sent, or any of a variety of timing points in the process of sending/receiving the message. In one embodiment, an update of the hop distance may be based in part on a number of client devices in a sequence of client devices for which the sharing message is forwarded beyond a client device receiving the sharing message from an originating sharing member, wherein the update of the hop distance indicates an updated level of interest in the content. In one embodiment, the hop distance may comprise at least two of a topological distance within the social network between members receiving the shared content, a number of network hyperlinks between a plurality of client devices receiving the shared content, a number of times the content is shared over the network, or any combination thereof.

In addition, an interface at the recipient's client device may be configured to display the message based on the hop distance. For example, FIG. 6 illustrates an example interface useable for managing a sharing content, including a multimedia object. Shown in FIG. 6 are message lists 605-606 with a plurality of messages, each message having an associated hop distance, such as the hop distance and/or combination relevance measure shown for item 608. In one embodiment, the messages may be displayed in a rank ordering based on the hop distances and/or combination relevance measures. In another embodiment, the hop distances and/or combination relevance measure may be displayed with the messages, however, in yet another embodiment, the hop distance and/or combination relevance measure may be hidden. In one embodiment, determination and/or use of the hop distance and/or combination relevance measure may be optional.

At decision block 408, it is determined whether the content is a multimedia object. If the content is determined as a multimedia object, processing continues to block 410. Otherwise, processing continues to block 413.

At block 410, a relevance measure based for the multimedia object is retrieved. In one embodiment, information identifying the multimedia object may be parsed from a hyperlink to the multimedia object, determined based on meta-data for the multimedia object, a sampling of the multimedia object, or the like. The information identifying the multimedia object may be a name of a track, artist, album, record label, genre, or the like. In one embodiment, the retrieved relevance measure may be based on the determined information identifying the multimedia object. In one embodiment, the retrieved relevance measure may be based on a non-hop distance measure, including play and sales number (e.g., volume of sale, dollars of sales, volume of downloads, volume of online play, a rate of change thereof), a vote for a popularity (e.g., may be an average of the vote), or any combination thereof. Such non-hop distance data may be determined for the name of the track, artist, album, record label, genre, or the like, for the multimedia object. For example, a critic, publisher, artist, or even consumers (e.g., listeners or viewers) of a multimedia object may rate the object, based on voting on the popularity of the multimedia object (e.g., using a star system, a number system, a thumbs up/down system). The relevance measure may be retrieved from any source, including a database, a third-party server/service, over a network, or the like.

At block 412, a combination of the relevance measure and a hop distance for the shared multimedia object is provided. In one embodiment, the combination relevance measure may be based on a weighted sum of the hop distance and the relevance measure, a product, a logarithmic product, inverse logarithmic product, a combination based on a threshold, a combination based on a percentage of a maximum hop distance, or any other combination of the hop distance and the relevance measure. For example, a shared song has a relevance measure of 3 stars and a hop distance of 10. The maximum hop distance for every shared content is 20. The new combination relevance measure may be computed by the function: relevance measure*(maximum hop distance/hop distance). For example, the combination relevance measure may be 1.5 stars=3*10/20.

In one embodiment, providing the combination relevance measure may comprise displaying the combination. In one embodiment, the hop distance, relevance measure, and/or a combination of the hop distance and relevance measure may be displayed co-located with the shared multimedia object, e.g., as simply a number, a spreadsheet, a chart, a graph, or the like. Referring to browser 500 of FIG. 5, the relevance measure may be displayed overlaid and in close proximity with the shared multimedia object and/or information, such as a hyperlink identifying the shared multimedia object within a web page. As shown, combination relevance measure 506 is overlaid and in close proximity with a hyperlink 504 to a shared multimedia object, and combination relevance measure 510 is overlaid and in close proximity with a hyperlink 508 to a shared multimedia object. Alternately, the hop distance, relevance measure, and/or a combination of the hop distance and relevance measure may be displayed in a sharing area for the shared multimedia object. Referring to sharing area 600 of FIG. 6, the combination may be displayed co-located with the shared multimedia object and/or information identifying the shared multimedia object. For example, lists 605-606 include a plurality of items. As shown, item 608 is a shared song with a co-located hop distance (20 hops) and a combination of a relevance measure and the hop distance. As shown, the combination relevance measure is 2 stars for item 608. Also as shown, the hop distance may also be displayed. In one embodiment, the hop distance and/or combination relevance measure may be configurable to be displayed, or filtered based on the source of the information. Processing next continues to block 414.

At block 413, the hop distance is displayed or otherwise provided. In one embodiment, the hop distance may be displayed co-located with the shared content, e.g., as simply a number, a spreadsheet, a chart, a graph, or the like. In one embodiment, if the shared content refers to a fragment of a web page (e.g., text, image object, hyperlink, or the like), the actual content may be retrieved and displayed. For example, if the shared content refers to an image, the image may be retrieved (e.g., using HTTP) and displayed in a sharing area. In one embodiment, the hop distance may be configurable to be displayed, or filtered based on the source of the information. Processing next continues to block 414.

Processing flows next to decision block 414, where a determination is made whether more message activity is to be managed. Such might arise, for example, as a message is forwarded through the social network, new messages are created and sent, or the like. If there is more activity, processing loops back to block 404; otherwise, processing returns to a calling process to perform other actions.

While process 400 describes sharing content of a plurality of types, including multimedia objects, in an alternate embodiment, process 400 may be adapted to share only multimedia objects. For example, in one embodiment, 413 and 408 may be optional and may not be performed. Blocks 402, 404, and 406 may be adapted to share or otherwise process only multimedia objects.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrated User Interface

Other aspects of the invention will now be described with respect to FIGS. 5-6. FIG. 5 illustrates an example interface useable for showing relevance measures for multimedia within a browser. Browser 500 includes a URL 502 for entering a URL for the web page, web content, hyperlinks 504 and 508 to media objects, and associated combined relevance measures 506 and 510. As shown, relevance measures 506 and 508 are overlaid (hovering) in close proximity with the associated hyperlinks 504 and 508. In one embodiment, the hyperlinks 504 and 508 are hyperlinks determined by a markup language (e.g., HTML) of the web page. In another embodiment, a browser plug-in may parse the text and create the hyperlinks based on the parsed text. In one embodiment, clicking on hyperlinks 504 and/or 508 may enable playing the multimedia object. In one embodiment, a player might be launched, such as sharing area 600 of FIG. 6. In another embodiment, the player may be web based and may be displayed in browser 500.

FIG. 6 illustrates an example interface useable for sharing, playing, and determining popularity of multimedia objects. Sharing interface 600 is but one of a variety of interfaces, and therefore is not to be construed as limiting the invention. As illustrated, sharing interface 600 includes message display 610, a user's shared content list 605 and a content list 606 of content from others. While two lists are shown, the interface may be provided in any other fashion without departing from the scope of the invention. For example, the project(s) my be organized as albums, folders, files, or the like.

Buttons 601-603 represent virtually any mechanism useable to select an action to be performed on a message, including, but not limited to sharing and/or forwarding, editing, deleting, or reading content. As shown, selected content 608 includes an item that was dragged-and-dropped by the user of the sharing area 600 onto sharing area. As shown, the selected content 608 is associated with 20 hop distance and 2 stars. The 2 stars is a combination of the hop distance and a relevance measure. In one embodiment, this represents that the selected content 608 has been shared 20 times with members of the social network. Other items and associated hop distances and/or combination relevance measures of the user's shared content and content shared by others are also shown in lists 605 and 606, respectively. As shown, the items may be a plurality of types, such as multimedia, text, link, or the like. In an alternate embodiment, the items may all be the same type (e.g., all items are multimedia objects). In one embodiment, the hop distance and/or combination relevance measure may be configurable to be displayed, or filtered based on the source of the information. In one embodiment, the hop distance and/or combination relevance measure may be filtered by the source of information. In one embodiment, a user may configure to only see information from their first, second or third degree friends, their friends in one of their buddy lists (e.g., work friends), but not in another buddy list, or the like.

Message display 610 may represent any mechanism useable to play, read and/or edit, and/or compose content, including a multimedia object. As shown, message display 610 shows the content for selected content 608. In general, message display 610 may display a plurality of types of content, including text content, multimedia content (e.g., images, sound, video), or the like. In one embodiment, message display 610 may retrieve the multimedia content over a network using, for example, HTTP. In one embodiment, message display 610 may enable stopping, starting, rewinding, or pausing a multimedia object, or the like.

In one embodiment, sharing area 600 may be provided through a component downloaded onto a client device, such as client devices 101-104. In another embodiment, sharing area 600 might be displayed within a browser window from a remote network device, or the like. Thus, sharing area 600 may be accessible from a client device using a variety of mechanisms, including, but not limited to, a combination of a client component and a remote network device.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method performed by a network device for sharing information over a network, comprising:

receiving a request to share content;

enabling, sharing over the network, of the content between an originating sharing member and a plurality of members of a social network by forwarding a sharing message from a client device associated with the originating sharing member to another client device associated with at least one of a receiving member of the plurality of members of the social network;

determining whether the content is a multimedia object;

employing at least the determination that the content is the multimedia object to retrieve a relevance measure based on an identity of the multimedia object; and employing at least the determination that the content is the multimedia object to provide a combination relevance measure that is a combination of the relevance measure and an updated hop distance for the shared multimedia object in real-time, the updated hop distance indicating a level of interest in the shared multimedia object by the plurality of members of the social network; wherein the updated hop distance is based in part on a number of client devices in a sequence of client devices for which the sharing message is forwarded beyond a client device receiving the sharing message from an originating sharing member.

2. The method of claim 1, wherein the retrieved relevance is based on another combination of a vote for a popularity and a play and sales number.

3. The method of claim 1, wherein the hop distance comprises a combination of at least two of a topological distance within the social network between members receiving the shared content, a number of network links between a plurality of client devices receiving the shared content, or a number of times the content is shared over the network.

4. The method of claim 1, wherein the shared multimedia object is at least one of a video object, an animation object, or a music object.

5. The method of claim 1, wherein enabling sharing further comprises:
forwarding the sharing message at a first degree of separation from the originating sharing member; and
if the receiving member indicates the content is to be shared, further forwarding the sharing message to another receiving member.

6. The method of claim 1, wherein providing a combination comprises:
displaying a weighted sum of the hop distance and the relevance measure, wherein the weighted sum is co-located with information identifying the multimedia object.

7. The method of claim 1, further comprising:
wherein the update enables re-computing the combination.

8. The method of claim 1, further comprising:
displaying the combination overlaid with a hyperlink identifying the multimedia object within a browser.

9. The method of claim 1, further comprising:
displaying of a sharing area for the multimedia object and the combination, if a user clicks on a portion of a web page identifying the multimedia object.

10. A client device for sharing information over a network, comprising:
a transceiver for communicating data;
a processor configured to perform actions comprising:
receiving a request to share content;
determining whether the content is a multimedia object;
employing at least the determination that the content is the multimedia object to retrieve a relevance measure based on an identity of the multimedia object;
enabling sharing, over the network, of the multimedia object between an originating sharing member and a plurality of members of a social network by forwarding a sharing message from a client device associated with the originating sharing member to another client device associated with at least one of a receiving member of the plurality of members of the social network; and
employing at least the determination that the content is the multimedia object to provide a display of the multimedia object and a combination relevance measure that is a combination of the relevance measure and an updated hop distance for the shared multimedia object in real-time, the updated hop distance indicating a level of interest in the shared multimedia object by the plurality of members of the social network; wherein the updated hop distance is based in part on a number of client devices in a sequence of client devices for which the sharing message is forwarded beyond a client device receiving the sharing message from an originating sharing member.

11. The client device of claim 10, wherein the client device is a mobile device.

12. The client device of claim 10, further comprising:
a browser plug-in configured to:
modify the web content to identify the multimedia object within web content; and
overlay the combination in close proximity with the identified multimedia object.

13. The client device of claim 10, further comprising:
a media playing component configured to play the multimedia object; and
a messenger plug-in configured to:
determine a hyperlink to the multimedia object based on an ownership of the multimedia object; and
share the hyperlink with the plurality of members of the social network identified by a buddy list within a messenger application.

14. The client device of claim 10, wherein the actions further comprise:
modifying the display to change an ordering of the multimedia object based on a change in the associated hop distance.

15. The client device of claim 10, wherein the identity of the multimedia object comprises a Uniformed Resource Locator (URL) included within web content, or a generated hyperlink to a copy of the multimedia object.

16. A system for sharing information over a network, comprising:
a display list component for displaying a plurality of items, wherein at least one of the items is a shared multimedia object and a co-located relevance measure that is updated in real-time for each sharing of the multimedia object between at least two members of a social network, and for providing a combination relevance measure that is a combination of the relevance measure and an updated hop distance for the shared multimedia object in real-time, the updated hop distance indicating a level of interest in the shared multimedia object by a plurality of members of the social network; wherein the updated hop distance is based in part on a number of client devices in a sequence of client devices for which the sharing message is forwarded beyond a client device receiving the sharing message from an originating sharing member;
a media player component for providing the shared multimedia object; and
a sharing area on a client device, configured to perform actions comprising:
receiving the shared multimedia object;
generating a sharing message comprising the shared multimedia object; and
forwarding the sharing message to a least one member of the social network.

17. The system of claim 16, wherein the shared multimedia object is at least one of a video object, an animation object, or a music object.

18. An apparatus for sharing information over a network, comprising:
a transceiver for communicating data;
a processor configured to perform actions comprising
receiving, over the network, information identifying a music object;
forwarding, over the network, a sharing message comprising the information identifying the music object to at least one client device associated with at least one member of a social network; and
providing, in real-time, an update of a hop distance and a relevance measure based on a play and sale number for the shared music object; and providing a combination relevance measure that is a mathematical combination of the relevance measure and the updated hop distance, the updated hop distance indicating a level of interest in the shared music object by a plurality of members of the social network; wherein the update of the hop distance is based in part on a number of client devices in a sequence of client devices for which the sharing message is forwarded beyond a client device receiving the sharing message from an originating sharing member.

19. The apparatus of claim 18, wherein forwarding the sharing message comprises:
  forwarding the sharing message to each contact within a contact list associated with an originating sharing member such that the sharing message is sent to each contact once.

\* \* \* \* \*

UNITED STATES PATENT AND TRADEMARK OFFICE
CERTIFICATE OF CORRECTION

| | | |
|---|---|---|
| PATENT NO. | : 8,260,882 B2 | |
| APPLICATION NO. | : 11/957069 | |
| DATED | : September 4, 2012 | |
| INVENTOR(S) | : Eun-Gyu Kim et al. | |

It is certified that error appears in the above-identified patent and that said Letters Patent is hereby corrected as shown below:

In column 20, line 23, in Claim 15, delete "Uniformed" and insert -- Uniform --, therefor.

Signed and Sealed this
Sixth Day of November, 2012

David J. Kappos
*Director of the United States Patent and Trademark Office*